(12) United States Patent
Saitou et al.

(10) Patent No.: US 6,967,065 B1
(45) Date of Patent: Nov. 22, 2005

(54) SEPARATOR OF PROTON EXCHANGE FUEL CELL AND ITS MANUFACTURING METHOD

(75) Inventors: Masahiro Saitou, Kanagawa-ken (JP); Kazuo Saito, Kanagawa-ken (JP); Kazuhide Matsumoto, Tokyo (JP); Masashi Takahashi, Kanagawa-ken (JP); Masayuki Itoh, Kanagawa-ken (JP); Kunihiko Wada, Kanagawa-ken (JP); Kazutoshi Takaishi, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/448,144

(22) Filed: Nov. 24, 1999

(30) Foreign Application Priority Data

Nov. 25, 1998 (JP) ............................... P10-334737

(51) Int. Cl.[7] ......................... H01M 2/00; H01M 2/02; H01M 2/16
(52) U.S. Cl. ........................................ 429/34; 429/247
(58) Field of Search ............................ 949/34, 30, 297, 949/42, 44, 33

(56) References Cited

U.S. PATENT DOCUMENTS

| | | | | |
|---|---|---|---|---|
| 4,759,993 A | * | 7/1988 | Pai et al. ..................... 428/450 |
| 5,460,896 A | * | 10/1995 | Takada et al. ................. 429/33 |
| 5,521,018 A | | 5/1996 | Wilkinson et al. |
| 5,624,769 A | * | 4/1997 | Li et al. ....................... 429/32 |
| 5,939,219 A | * | 8/1999 | Jansing et al. ................. 429/32 |
| 6,090,228 A | * | 7/2000 | Hwang et al. ............... 148/518 |
| 6,103,413 A | * | 8/2000 | Hinton et al. .................. 429/32 |
| 6,153,324 A | * | 11/2000 | Hiermaier et al. ............. 429/16 |
| 6,440,598 B1 | * | 8/2002 | Fukui et al. ................... 429/34 |

FOREIGN PATENT DOCUMENTS

| | | | |
|---|---|---|---|
| JP | 11-121018 | 4/1999 | |
| JP | WO99/19927 | * 4/1999 | ........... H01M 2/00 |
| JP | 11-126621 | 5/1999 | |
| JP | 11-126622 | 5/1999 | |
| JP | 11-144744 | 5/1999 | |

OTHER PUBLICATIONS

G. Faita, et al., Dept. of Physical/Chemistry & Electrochemistry, University of Milan, 9 pages, "Influence of the Construction Materials on the Structure of Membrane Fuel Cells Stacks".

* cited by examiner

*Primary Examiner*—Patrick Joseph Ryan
*Assistant Examiner*—Julian Mercado
(74) *Attorney, Agent, or Firm*—Oblon, Spivak, McClelland, Maier & Neustadt, P.C.

(57) ABSTRACT

A separator of a proton exchange fuel cell. In a cell stack of a proton exchange fuel cell, the cell stack composed by laminating a plurality of unit cells and a plurality of separators, each of the unit cells composed of an anode electrode, a cathode electrode and a solid polymer electrolytic membrane arranged between the anode and cathode electrodes, each of the separators arranged between the unit cells, respectively, the separator of the proton exchange fuel cell includes a separator substrate and a multi-coating layer formed on the separator substrate. The multi-coating layer includes at least two layers of a low electric resistance layer, a corrosion resistance layer and a peeling resistance layer.

2 Claims, 8 Drawing Sheets

SEPARATOR OF PROTON EXCHANGE FUEL CELL AND ITS MANUFACTURING METHOD

BACKGROUND OF THE INVENTION

1. Field of the Invention

The present invention relates to a separator of a proton exchange fuel cell using solid polymer membrane as electrolyte and its manufacturing method, and more particularly to a separator and its manufacturing method for providing a separator of a proton exchange fuel cell in compact size and light weight at low cost.

2. Description of the Related Art

A fuel cell is a device to convert chemical energy of fuel into electric energy by bringing fuel such as hydrogen and oxidizing agent such as air to electrochemically react each other.

Various types of fuel cells which differ according to type of electrolyte used are known; for instance, phosphoric acid type, fused carbonate type, solid oxide type and proton exchange type. Of these fuel cells, a proton exchange fuel cell is a fuel cell utilizing the fact that when polymer resin membrane containing proton exchange radical in module is saturated with water it acts as proton conductive electrolyte. The proton exchange fuel cell acts in a relatively low temperature range with excellent power generating efficiency and attracts attention in recent years.

FIG. 9 is a diagram showing the structure of a unit cell that is a base unit of a conventional proton exchange fuel cell.

As shown in FIG. 9, a unit cell 1 is composed of an ion conductive solid polymer membrane 2, an anode electrode 3 and a cathode electrode 4 arranged with solid polymer membrane 2 interposed between them. Further, at the outsides of these electrodes 3, 4, there are arranged an anode electrode side separator 5 and a cathode electrode side separator 6, each of which is gas impermeable and has a gas supply groove for supplying reaction gas to one of electrodes 3, 4.

As ion conductive solid polymer membrane 2, for instance, perfluorocarbon-sulfonic acid (Nafion R: Du Pont, U.S.A.), which is a proton exchange membrane, is known. Solid polymer membrane 2 contains hydrogen ion exchange radical in its molecule, and functions as an ion conductive electrolyte when saturated in water, and also, has a function to separate fuel 7 supplied from anode electrode 3 side and an oxidizing agent 8 supplied from cathode electrode 4 side.

Anode electrode 3 arranged at one side of solid polymer membrane 2 is formed of a catalytic layer 3a and a porous carbon flat plate 3b. Further, cathode electrode 4 arranged opposing anode electrode 3 is formed of a catalytic layer 4a and a porous carbon flat plate 4b.

Separator 5 at the anode electrode side is composed of a separator substrate 9 and fuel supply grooves 10a, 10b arranged at both sides of separator substrate 9 for supplying fuel.

On the other hand, separator 6 arranged at the cathode electrode side is composed of a separator substrate 11, an oxidizing agent supply groove 12 for supplying an oxidizing agent arranged on one surface of separator substrate 11 at the surface side contacting cathode electrode 4, and a fuel supply groove 10 for supplying fuel arranged on another surface of separator substrate 11.

The principle of unit cell 1 will be described below.

When fuel 7 is supplied to anode electrode 3 and oxidizing agent 8 is supplied to cathode electrode 4, the electromotive force is generated by the electrochemical reaction between a pair of electrodes 3, 4 of unit cell 1. Normally, hydrogen is used as fuel 7 and air is used as oxidizing agent 8.

When hydrogen is supplied as fuel to anode electrode 3, hydrogen is ionized into hydrogen ion and electron in anode catalytic layer 3a (Anode reaction). The hydrogen ion moves to cathode electrode 4 through solid polymer membrane 2, and the electron moves to cathode electrode 4 through an external circuit. On the other hand, the oxygen contained in the air is supplied to cathode electrode 4 as oxidizing agent 8 causes the cathode reaction by the hydrogen ion and the electron in catalytic layer 4a to generate water. At this time, the electrons pass through the external circuit and become a current and is able to feed electric power. In other words, in anode electrode 3 and cathode electrode 4, reactions shown below will progress. Further, the generated water is discharged together with not-reacted gas to the outside of unit cell 1.

Anode Reaction: $H_2 \rightarrow 2H^+ + 2e^-$

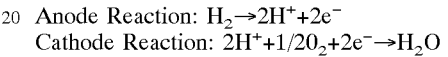

Cathode Reaction: $2H^+ + 1/2O_2 + 2e^- \rightarrow H_2O$

In such unit cell 1, if water content in solid polymer membrane 2 becomes less, ion resistance becomes high, and mixing of fuel 7 and oxidizing agent 8 (crossover) is taken place, and unit cell 1 is not able to generate the electric power. So, it is desirable to keep solid polymer membrane 2 in the state saturated with water.

Further, when the hydrogen ion ionized in anode electrode 3 at the power generation moves to cathode electrode 4 through solid polymer membrane 2, water also moves jointly. So, at the anode electrode 3 side, solid polymer membrane 2 tends to become dry. Further, if moisture contained in supplied fuel 7 or supplied air is less, solid polymer membrane 2 tends to become dry at around respective inlet ports of reaction gasses. For this reason, pre-humidified fuel 7 and pre-humidified oxidizing agent 8 are generally supplied to unit cell 1.

By the way, electromotive force of unit cell 1 is low as below 1 volt, and a cell stack is generally formed by laminating several tens to several hundreds of unit cells 1 via separators 5, 6 arranged at the upper and lower sides of unit cells 1. Cooling plates are inserted into respective unit cells 1 in order to control the temperature rise of the cell stack resulting from the power generation.

Separators 5, 6 used in a proton exchange fuel cell are required to be impermeable to reaction gas and cooling water in order to provide with the function to separate each of unit cells 1. On the other hand, separators 5, 6 are also required to be electrically conductive in order to laminate unit cells 1 to provide a cell stack and to function as the fuel cell. Normally, a proton exchange fuel cell is operated at relatively low temperature of 70~90° C. Separators 5, 6 inside the proton exchange fuel cell are under the severe environment where they are exposed to the air containing water vapor whose vapor pressure is close to a saturated vapor pressure at the temperature of 70~90° C., and at the same time, potential difference is generated between separators 5, 6 pursuant to the electrochemical reaction. So, it is necessary to select a corrosion proof material for the separators 5, 6. As corrosion proof material, stainless steel, etc. are generally used. When stainless steel, etc. are applied to separators 5, 6, the surface thereof is oxidized and passive state membrane is formed on the surface thereof. As a result, resistance loss of the fuel cell becomes large and power generating efficiency drops largely.

In the U.S.A., during 1970's, for the separators of the proton exchange fuel cell developed for the space shuttle, niobium which is excellent corrosion proof noble metal, was used. However, noble metal materials have such defects that they are extremely expensive and heavy. So, as disclosed in U.S. Pat. No. 5,521,018, Ballard Power Systems Inc. of Canada uses carbon plates for separators so as to reduce the weight and cost of a cell stack.

FIG. 10 shows the construction of a cell stack of a conventional proton exchange fuel cell using carbon plates for separators.

As sown in FIG. 10, a cell stack 13 is composed of, in an outer frame 14, a cell portion 15 which generates electric power by reacting gas, and a humidifying portion 16 for humidifying reaction gas. In cell portion 15, a plurality of unit cells 1 are arranged in outer frame 14.

FIG. 11 is a schematic diagram showing the structure of conventional unit cell 1 in cell portion 15 shown in FIG. 10.

As shown in FIG. 11, in unit cell 1 arranged in cell portion 15 is in the structure as described below. Anode electrode 3 and cathode electrode 4 are arranged with ion conductive solid polymer membrane 2 interposed between them. A cooling separator 17 is provided at the outside of anode electrode 3, and anode electrode side separator 5 is provided at the further outside of cooling separator 17. Further, at the outside of cathode electrode 4, cathode electrode side separator 6 is provided.

Cooling separator 17 is provided to prevent the heating of the cell portion 15 by absorbing the reaction heat generated from the reaction by cooling water.

FIG. 12 is a plan view showing the construction of conventional separator 6 provided at the cathode electrode side.

As shown in FIG. 12, separator 6 is composed of a nearly square shaped separator substrate 11 made of a carbon plate with an air induction port 18 for inducing air and a fuel gas induction port 19 for inducing fuel gas provided at one corner of separator substrate 11. At the side opposing these induction ports 18, 19, an air discharging port 20 for discharging air and a fuel gas discharging port 21 for discharging fuel gas are provided. Further, at other corners of separator substrate 11, a cooling water induction port 22 and a cooling water discharging port 23 are provided. On separator substrate 11, a serpentine shaped air groove 24 is formed for inducing air to the reaction surface. Air groove 24 connects air induction port 18 and air discharging port 20. Though not shown in FIG. 12, at the under side of separator substrate 11, the fuel supplying groove is formed, which connects fuel gas induction port 19 and fuel gas discharging port 21.

Air groove 24 is formed on separator substrate 11 made of relatively soft carbon plate by applying the press working at one surface thereof. Further, the fuel supplying groove is formed on separator substrate 11 by applying the press working at another surface thereof.

Further, although not illustrated here, separator 5 at the anode electrode side and cooling separator 17 have almost the same structure as that of separator 6 at the cathode electrode side.

The structure of humidifying portion 16 shown in FIG. 10 is almost the same as that of cell portion 15. In cell portion 15, reaction gasses mutually contact via solid polymer membrane 2. However, in humidifying portion 16, air or fuel gas, that is reaction gas, is humidified by contacting cooling water via a steam transmission membrane.

However, even in the case of separators 5, 6 as described above, there is still a restriction for making the thickness of separators 5, 6 thin.

As reasons for this, it is pointed out that first, in the case of a proton exchange fuel cell using a carbon plate for separators 5, 6, a certain thickness is needed for the carbon plate in order to maintain the strength as separators 5, 6. Secondly, a carbon plate is intrinsically porous material and it is necessary to prevent transmission of gas and water between the separators, and therefore, it is restricted to make the thickness of separators 5, 6 thin. In the U.S. Pat. No. 5,521,018, the thickness of separators is 1.6 mm and a certain thickness is demanded.

To make cell stack 13 compact, it is most important to make the thickness of unit cell 1 thin. However, when a carbon plate is applied to a separator, there is such a problem that, it is restricted to make the separators thin and it is difficult to make cell stack in a compact size.

Furthermore, as the carbon material itself is expensive, there is such a problem that it is difficult to provide a cell stack 13 at low cost.

Furthermore, as the carbon plate has lower thermal conductivity than that of such metals as aluminum, copper, etc., it is needed to cool down unit cells 1 by inserting cooling plates 17 to flow cooling water between respective unit cells 1. Accordingly, there is such a problem that a cell stack becomes a larger size, and air-cooling is difficult to adopt in the proton exchange fuel cell.

On the other hand, in the case wherein metal is used as separator substrate instead of carbon plate, there is such a problem that the corrosion is generated when using the separators in the saturated steam atmosphere or by the potential difference generated specifically to the fuel cell and thereby the cell performance drops.

SUMMARY OF THE INVENTION

Accordingly one object of this invention is to provide a separator of a proton exchange fuel cell in compact size and light weight at low cost.

Another object of this invention is to provide a manufacturing method of a separator of a proton exchange fuel cell in compact size and light weight at low cost.

These and other objects of this invention is achieved by providing a separator of a proton exchange fuel cell. In a cell stack of a proton exchange fuel cell, the cell stack composed by laminating a plurality of unit cells and a plurality of separators, each of the unit cells composed of an anode electrode, a cathode electrode and a solid polymer electrolytic membrane arranged between the anode and cathode electrodes, each of the separators arranged between the unit cells, respectively, the separator of the proton exchange fuel cell includes a separator substrate and a multi-coating layer formed on the separator substrate. The multi-coating layer includes at least two layers of a low electric resistance layer, a corrosion resistance layer and a peeling resistance layer.

According to one aspect of this invention, there is provided a separator of a proton exchange fuel cell as described above. Further, the multi-coating layer includes the peeling resistance layer provided on the separator substrate, the corrosion resistance layer provided on the peeling resistance layer, and the low electric resistance layer provided on the corrosion resistance layer.

The low electric resistance layer prevents the drop of electric resistance when contacted, the corrosion resistance layer prevents the corrosion of separator substrate, and the peeling resistance layer improves the adhesive strength of the coating film so as to prevent its peeling.

As described above, the separators of a proton exchange fuel cell are exposed to saturated steam at 70~90° C. and are subject to the severe state of potential difference specific to the fuel cell. Therefore, as in the present invention, when the coating layer is made with a multi-layer structure composed of the low electric resistance layer, the corrosion resistance layer and the peeling resistance layer, functions demanded for the separator are taken by respective coating layers, and the performance of the separators can be fully taken out. In particular, by lowering the electric contact resistance of the separator, which is an important cell performance, voltage drop due to the resistance of unit cell can be prevented.

Further, according to the present invention, continuous air holes, penetrated to the interface of the separator substrate with the coating layer, produced when manufacturing the separator can be intercepted. Therefore, when supplying fuel to the anode electrode and air to the cathode electrode as an oxidizing agent, corrosion of the separator by reaction gas, such as hydrogen and oxygen, or in the saturated steam atmosphere can be prevented.

Further, because of providing the peeling resisting layer, adhesion strength of the coating film can be improved, thus preventing the film peeling when forming it and the highly reliable film having no such defects as air holes can be formed. So, according to the present invention, a stabilized output can be obtained from a proton exchange fuel cell for a long time.

According to another aspect of this invention, there is provided a separator of a proton exchange fuel cell. The multi-coating layer includes a peeling resistance and corrosion resistance layer made as one layer by combining the peeling resistance layer and the corrosion resistance layer provided on the separator substrate, and the low electric resistance layer provided on the peeling resistance and corrosion resistance layer.

According to the present invention, it is possible to reduce the electrical contact resistance of the separator, which is important as cell performance, in the low electric resistance layer, to prevent voltage drop caused by the resistance of the unit cell, and to improve the performance and reliability of the fuel cell. Further, as the corrosion resistance layer is provided under the low electric resistance layer, it is possible to intercept such corrosion factors as oxygen, corrosion products, etc. entering through air holes existing in the low electric resistance layer by the corrosion resistance layer formed uniformly and minutely without air holes. As a result, peeling of the coating film and the performance drop of the separator substrate caused by corrosion can be prevented. Furthermore, because the peeling resistance layer is provided under the low electric resistance layer or the corrosion resistance layer, the adhesion of the coating film that is insufficient in the low electric resistance layer or the corrosion resistance layer can be improved. Therefore, it becomes possible to prevent the peeling of the coating film caused when forming the coating film or using the separator, and to form the highly reliable low electric resistance layer and the corrosion resistance layer without such defects as air holes.

According to another aspect of this invention, there is provided a separator of a proton exchange fuel cell. The separator substrate includes one kind or a composite material of two or more kinds of stainless steel, copper and its alloy, aluminum and its alloy, and titanium and its alloy.

According to the present invention, the material of the separator substrate is excellent in strength and ductility. Therefore, it is possible to make a thickness of the separator thinner than that made of carbon and to make the fuel cell compact and in light weight. Further, as the material of the separator substrate has excellent thermal conductivity, it becomes possible to transmit heat generated when starting, operating and stopping efficiently to a cooling medium in the manifold and thus, improving the cooling performance. In addition, as electric resistance of the separator substrate is low, it is also possible to reduce electrical contact resistance of the separator, which is important as cell performance and to eliminate the voltage drop that is caused by the resistance of unit cell.

According to another aspect of this invention, there is provided a separator of a proton exchange fuel cell. The multi-coating layer includes one kind or a composite material of two or more kinds of materials having low contact resistance of Ni, Fe, Co, B, Pb, Cr, Cu, Ti, Bi, Sn, W, P, Mo, Ag, Pt, Au, TiC, NbC, TiCN, TiN, CrN, $TiB_2$, $ZrB_2$. $Fe_2B$, and $Si_3N_4$.

According to the present invention, because of the excellent affinity of the coating film with the separator substrate, it is possible to improve the adhesion of the coating film, to prevent the peeling of the coating film when forming, and to form a highly reliable coating film without such defects as air holes.

According to another aspect of this invention, there is provided a method of manufacturing a separator of a proton exchange fuel cell. In a cell stack of a proton exchange fuel cell, the cell stack composed by laminating a plurality of unit cells and a plurality of separators, each of the unit cells composed of an anode electrode, a cathode electrode and a solid polymer electrolytic membrane arranged between the anode and cathode electrodes, each of the separators arranged between the unit cells, respectively, the separator of the proton exchange fuel cell including a separator substrate and a multi-coating layer formed on the separator substrate, and the multi-coating layer including at least two layers of a low electric resistance layer, a corrosion resistance layer and a peeling resistance layer, a method of manufacturing the separator of the proton exchange fuel cell includes the steps of preparing the separator substrate and forming the multi-coating layer on the separator substrate by one kind or a composite process of two or more kinds of processes capable of forming a thin film of physical evaporation process, chemical evaporation process, nitride treating process, boride treating process, carbonizing process, plating process and spraying process.

According to another aspect of this invention, there is provided a method of manufacturing a separator of a proton exchange fuel cell as described above. Further, the step of forming the multi-coating layer included the steps of forming the peeling resistance layer on the separator substrate, forming the corrosion resistance layer on the peeling resistance layer, and forming the low electric resistance layer on the corrosion resistance layer.

According to the present invention, it is possible to form material having low electric resistance and contact resistance thin and uniform on the separator substrate and to form corrosion resistant material minutely without defects on the separator substrate. Further, it is possible to form material that is excellent in adhesion and ductility thin, uniform and minutely on the separator substrate.

According to another aspect of this invention, there is provided a method of manufacturing a separator of a proton exchange fuel cell. In the step of forming the multi-coating layer, the multi-coating layer is formed using the plating process such that a film thickness of the low electric resistance layer is made at 0.02 $\mu$m or more, that of the corrosion resistance layer is made at 0.1 $\mu$m or more, and that of the peeling resistance layer is made at 0.1 $\mu$m or more.

According to another aspect of this invention, there is provided a method of manufacturing a separator of a proton exchange fuel cell. In the step of forming the multi-coating layer, the multi-coating layer is formed using the physical evaporation plating process such that a film thickness of the low electric resistance layer is made at 1.0 μm or more, that of the corrosion resistance layer is made at 1.0 μm or more, and that of the peeling resistance layer is made at 1.0 μm or more.

According to the present invention, in the low electric resistance layer, electric resistance does not drop when contacted the coating film surface. Accordingly, it is possible to reduce electrical contact resistance of the separator, which is important cell performance, and to minimize the voltage drop caused by the resistance of the unit cell. Further, in the corrosion resistance layer, it is possible to minimize corrosion factors, such as oxygen, and corrosion products, etc., entering through the air holes existing in the low electric resistance layer. As a result, it is possible to prevent the peeling of a coating film and the performance drop of the separator substrate due to the corrosion. Furthermore, in the peeling resistance layer, the adhesion of the coating film that is insufficient in the low electric resistance layer or the corrosion resistance layer can be improved. Accordingly, it becomes possible to minimize the peeling of the coating film of the low electric resistance layer or the corrosion resistance layer. As a result, it is possible to form a highly reliable low electric resistance layer and the corrosion resistance layer without such defects as air holes.

According to another aspect of this invention, there is provided a method of manufacturing a separator of a proton exchange fuel cell, wherein crystal orientation of each layer composing the multi-coating layer is oriented to a direction of Miller index (200) or (002).

According to the present invention, it is possible for the multi-coating layer to obtain excellent mechanical strength, peeling resistance and corrosion resistance in such severe environments as in the corrosion caused due to the saturated steam at 70~90° C. for a long time and the potential difference specific to the fuel cell.

According to another aspect of this invention, there is provided a method of manufacturing a separator of a proton exchange fuel cell, wherein porosity in the multi-coating layer is made at $5\times10^0\%$ or less in terms of defective area rate.

According to the present invention, it is possible to minimize such corrosion factors as oxygen and corrosion products, etc. entering through the air holes, to reduce the quantity of metallic ions flowing into the cooling medium or the saturated steam, and to prevent the electric short circuit between the cathode electrode and the anode electrode. Further, it is possible to improve peeling resistance and corrosion resistance in such severe environments as in the corrosion caused due to the saturated steam at 70~90° C. for a long time and the potential difference specific to the fuel cell.

According to another aspect of this invention, there is provided a method of manufacturing a separator of a proton exchange fuel cell, wherein material for the multi-coating layer formed on the separator substrate includes one kind or a composite alloy material of two or more kinds of materials having a lower electric resistance than that of the separator substrate of metallic material, ceramics material and cermet material.

According to the present invention, it is possible to reduce electrical contact resistance of the separator, which is important cell performance, and to minimize the voltage drop due to the resistance of the unit cell.

According to another aspect of this invention, there is provided a method of manufacturing a separator of a proton exchange fuel cell. The method further includes a step of removing passive state film or oxide existing on the separator substrate electrically, mechanically or chemically before the step of forming the multi-coating layer.

According to the present invention, because the coating is applied to the separator substrate after removing a passive state film or oxide existing thereon, it is possible to promote the adhesion of the coating film with the separator substrate, to minimize the peeling of the coating film when forming it, and to form a highly reliable coating film without causing such defects as air holes. Further, while maintaining the material adhesion efficiency to a minimum when forming the coating film, the separator manufacturing cost can be reduced.

According to another aspect of this invention, there is provided a method of manufacturing a separator of a proton exchange fuel cell. In a cell stack of a proton exchange fuel cell, the cell stack composed by laminating a plurality of unit cells and a plurality of separators, each of the unit cells composed of an anode electrode, a cathode electrode and a solid polymer electrolytic membrane arranged between the anode and cathode electrodes, each of the separators arranged between the unit cells, respectively, the separator of the proton exchange fuel cell including a separator substrate and a multi-coating layer formed on the separator substrate, and the multi-coating layer including at least two layers of a low electric resistance layer, a corrosion resistance layer and a peeling resistance layer, a method of manufacturing the separator of the proton exchange fuel cell, includes the steps of preparing the separator substrate, forming the multi-coating layer on the separator substrate by one kind or a composite process of two or more kinds of processes capable of forming a thin film of physical evaporation process, chemical evaporation process, nitride treating process, boride treating process, carbonizing process, plating process and spraying process, removing the multi-coating layer electrically, mechanically or chemically, so that the multi-coating layer and the separator substrate are individually recovered, and reusing material of the recovered multi-coating layer in manufacturing the separator of the proton exchange fuel cell.

According to another aspect of this invention, there is provided a method of manufacturing a separator of a proton exchange fuel cell as described above. The method of manufacturing the separator of the proton exchange fuel cell further includes the step of, after recovering the separator substrate, pulverizing and resolving the recovered separator substrate electrically, mechanically or chemically, and reusing material of the recovered separator substrate in manufacturing the separator of the proton exchange fuel cell.

According to the present invention, as the coating layer and the separator substrate are individually recovered, treated and reused, it is possible to prevent the exhaust of resources, to reduce the separator manufacturing cost and to obtain a proton exchange fuel cell at low cost.

According to another aspect of this invention, there is provided a separator of a proton exchange fuel cell by using the method of manufacturing the separator of the proton exchange fuel cell as described above.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
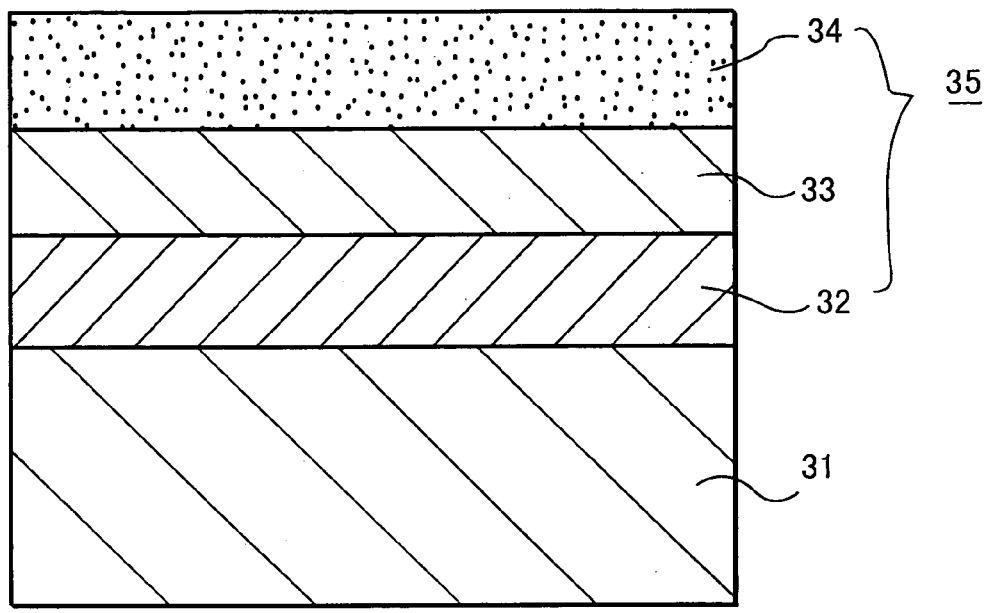
FIG. 1 is a vertical sectional view of a separator of a proton exchange fuel cell in a first embodiment of the present invention.

Referring now to the drawings, wherein like reference numerals designate identical or corresponding parts throughout the several views, the embodiments of this invention will be described below.

Figure 2:
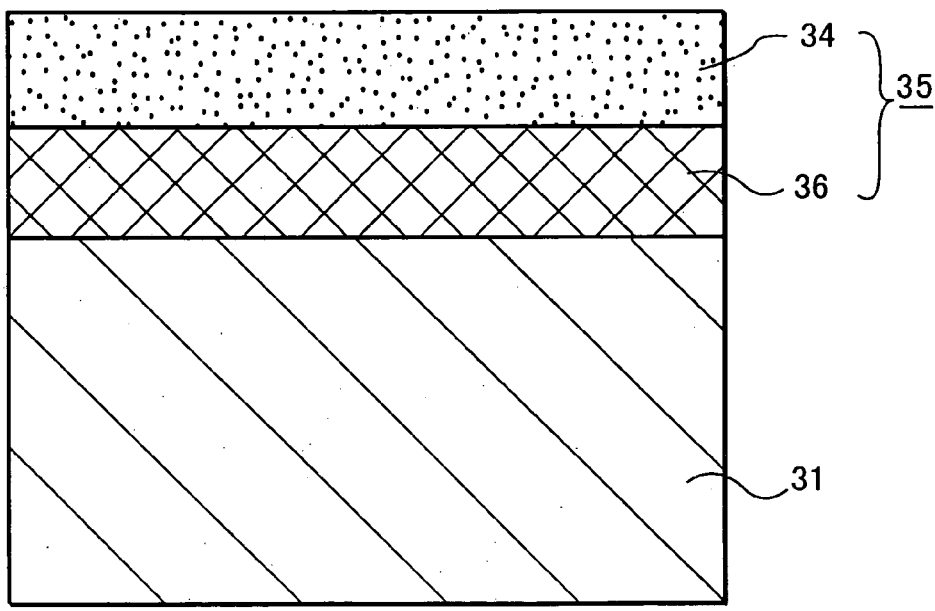
FIG. 2 is a vertical sectional view of a separator of a proton exchange fuel cell in the first embodiment of the present invention.

First Embodiment (FIG. 1, FIG. 2)

Hereinafter, a first embodiment of this invention will be described with reference to FIGS. 1 and 2. In this embodiment, a separator was manufactured by coating the separator substrate with a multi-coating layer. Further, a serpentine shaped air groove was formed on the separator substrate, and an air inducing port and an air discharging port were also formed thereon. Further, the multi-coating layer was composed of a low electric resistance layer, a corrosion resistance layer and a peeling resistance layer.

As the separator substrate, one of stainless steel, copper and its alloy, aluminum and its alloy, titanium and its alloy or composite materials of two or more kinds of these materials were used.

First, passive state film or oxide existing on the separator substrate was electrically, mechanically or chemically removed. Firstly, the separator substrate was coated with the peeling resistance layer as the coating layer. Then, the corrosion resistance layer was coated over the peeling resistance layer, and the low electric resistance layer was coated on the most outer layer.

As a material for the low electric resistance layer, one kind or a composite material of two or more kinds of Ni, Fe, Co, B, Pb, Cr, Cu, Ti, Bi, Sn, W, P, Mo, Ag, Pt, Au, TiC, NbC, TiCN, TiN, CrN, $TiB_2$, $ZrB_2$, $Fe_2B$ and $Si_3N_4$ was used. Here, each of these materials has electric resistance equivalent to or lower than 1000 $\mu\Omega cm^2$ that is the electric resistance of carbon material which was conventionally used for separator substrate.

Further, the materials for the corrosion resistance layer and the peeling resistance layer were selected from the same materials as the low electrical resistance layer from the view point of porosity, adherence, ductility or coating workability, and one kind or a composite material of two or more kinds of these materials excellent in affinity in the materials was used.

For these coating methods, one kind or a composite process of two or more kinds of a physical evaporation process, a chemical evaporation process, a nitride process, a boronizing process, a carbonizing process, a plating process and a spraying process capable of forming a thin film is used. Further, for coating materials respectively used for the low electric resisting layer, the corrosion resistance layer and the peeling resistance layer, there are materials usable and not usable materials depending on a coating method to be used. Therefore, it is better to select an optimum coating method according to a material that is to be actually used.

As the physical evaporation process, for instance, one kind or a composite process of two or more kinds of a vacuum evaporation process, an ion plating process, a spattering process and an ion beam mixing process is used. As the chemical evaporation process, one kind or a composite process of two or more kinds of a thermal CVD process, a plasma CVD process and a laser CVD process is used. As the nitride process, either one kind of a gas nitriding process and a molten salt bath process or a composite process of these processes is used. As the boronizing process, a molten salt bath process is used.

As the carbonizing process, one of a carbon coating process (heat treat after forming a film by coating carbon material with a brush) and a carbon spray process (heat treat after mixing carbon material with a bonding agent in a liquefied state and sprayed) or a composite process of these processes is used. As the plating process, one of a substitution plating process, an electric plating process, an electrodeless plating process, a molten plating process and an anode oxidation process or a composite process of two of more kinds of these processes is used. As the spraying process, one of a gas spraying process, an arc spraying process, a plasma spraying process and a high-speed gas flame spraying process or a composite process of two or more kinds of these processes is used.

A schematic diagram of a sectional view of a separator for a proton exchange fuel cell obtained according to these processes shown in FIG. 1.

As shown in FIG. 1, a separator 30 is composed of a separator substrate 31 made of a thin metal plate covered by a coating layer 35, which is composed of a peeling resistance layer 32, a corrosion resistance layer 33 and a low electric resistance layer 34.

Here, it is noted that separator substrate 31 are covered by coating layer 35 at both surfaces thereof. In FIG. 1, cross section showing only one surface side of separator 30 is shown. Also, in each of the following FIGS. 2–6, cross section showing only one surface side of the separator is shown.

Further, if the materials used for peeling resistance layer 32 and corrosion resistance layer 33 have the functions of both layers or corrosion resistance layer 33 and low electric resistance layer 34 have the functions of both layers, the number of layers can be reduced by combining low electric resistance layer 34 and corrosion resistance layer 33 into one layer or by combining corrosion resistance layer 33 and peeling resistance layer 32 into one layer. This is shown in FIG. 2.

As shown in FIG. 2, separator 30 is composed of separator substrate 31 made of a thin metal plate covered by coating layer 35. This coating layer 35 is composed of a peeling resistance and corrosion resistance layer 36 which is made as one layer by combining peeling resistance layer 32 and corrosion resistance layer 33 and low electric resistance layer 34 covering this layer 36.

Further, separator 30 is given with a function to separate each of unit cells. In a fuel cell, several tens~several hundreds of unit cells are laminated via respective separators 30. Therefore, it is necessary to use coating materials having low electric resistance for the most outer layers of coating layer 35 of the separator 30 where separator 30 contacts the cathode electrode and separator 30 contacts the anode electrode. As shown in FIG. 1 and FIG. 2, for reducing the contact resistance between separators 30 and the electrodes, low electric resistance layer 34 is provided on the most outer layers of separator 30.

According to the embodiment of this invention described below, coating layer 35 was formed on separator substrate 31 according to the plating process (Example 1) or the physical evaporating process (Example 2).

Example 1

In this example, the plating process was used.

Multi-coating layer 35 was coated on separator substrate 31 according to the plating process.

As materials for coating layer 35, Ni or its alloy was arranged on separator substrate 31 and Au or its alloy was arranged on the most outer layer.

Further, Ni or its alloy was arranged on separator substrate 31, and Cr or its alloy was arranged thereon, Ni or its alloy was arranged thereon, and further, Au or its alloy was arranged on the most outer layer.

According to this example, at the Au layer of the coating surface, the drop of electric resistance when contacted is prevented. At the Ni layer thereunder, the adhesion strength with the Au layer is improved and the peeling of the coating is prevented. Further, the corrosion factors such as oxygen and corrosion products entering through the air holes existing in the Au layer are intercepted and the peeling of the coating caused by corrosion is prevented. Further, at the Cr layer thereunder, such corrosion factors as oxygen and corrosion products entering through the air holes existing in the Au layer and the Ni layer thereunder are intercepted as they are turned to Cr oxide, and the peeling of the coating caused by corrosion is prevented. At the Cr oxide layer, as the passive state film of the substrate is destructed to form a Ni layer, the adhesion strength with separator substrate 31 is improved, and thereby the peeling of the coating is prevented.

Example 2

In this example, the physical evaporation process was used.

Multi-coating layer 35 was coated on separator substrate 31 according to the physical evaporation process.

As materials for coating layer 35, Cr or its alloy was arranged on the separator substrate 31, and TiN or its alloy was arranged on the most outer layer.

Further, Cr or its alloy was arranged on separator substrate 31, TiN or its alloy was arranged thereon, Cr or its alloy was arranged thereon, and further TiN or its alloy was arranged on the most outer layer.

According to this example, at the TiN layer of the coating surface, the drop of electric resistance when contacted is prevented. At the Cr layer thereunder, the adhesion strength with the TiN layer is improved and the peeling of the coating is prevented. Further, the corrosion factors such as oxygen and corrosion products entering through the air holes existing in the TIN layer are intercepted as they are turned to Cr oxide and the peeling of the coating caused by corrosion is prevented. Further, at the TIN layer thereunder, such corrosion factors as oxygen and corrosion products entering through the air holes existing in the Cr layer are intercepted and the peeling of the coating caused by corrosion is prevented. At the Cr layer thereunder, the adhesion strength with the TIN layer is improved, the peeling of the coating is prevented, and also, corrosion factors such as oxygen and corrosion products entering through the air holes existing in the TIN are intercepted as they are turned to Cr oxide, and the peeling of the coating caused by corrosion is prevented.

So, according to this embodiment, in separator 30 for proton exchange fuel cell, materials having lower electric resistance than that of separator substrate 31, such as metallic material, ceramics material, cermet material and a composite alloy material of these materials were coated on the surface of separator substrate 31, electrical contact resistance of separator 30 that is an important cell performance can be lowered, and voltage drop caused by resistance of unit cells can be minimized.

Further, according to the coating method in this embodiment, a thin film can be formed. Further, it is possible not only to form a material of low electric resistance and contact resistance thin and uniform but also to form excellent corrosion resistance material minutely with less defects. Therefore, a material that is excellent in adhesion strength and ductility can be formed thin and uniform. Further, by removing a passive state film or oxide existing on separator substrate 31 electrically, mechanically or chemically, it is possible to improve adhesion strength of separator substrate 31 with the coating film. Therefore, it is possible to minimize the peeling of the film when forming the film and to form the highly reliable coating film with less defects such as air holes, etc. Further, it is also possible to reduce manufacturing cost of the separators while maintaining material deposition efficiency to a minimum when forming a film.

Further, according to this embodiment, as a metallic material which is excellent in strength and ductility is used for separator substrate 31, the plate thickness thereof can be made thinner than carbon. As a result, a fuel cell can be made compact and light. Actually, when a metallic separator is used, the plate thickness of the separator can be made thin as below 0.4 mm, which is a thickness of approximately ¼ times that of a conventional plate thickness. Further, as a metallic material is excellent in thermal conductivity, it becomes possible to efficiently transmit heat generated at the time of start, operation and stop to a cooling medium in a manifold, and the cooling performance is thereby improved.

Thus, as an excellent heat conductive material is used for the separator, separator 31 can be used as an air-cooled radiating fin, and as a result, an air-cooling system can be adopted. When the air-cooling system is adopted, cooling water and a piping for circulation of cooling water, pump, etc. become unnecessary, and as a result, the system is simplified. Further, cooling water manifold holes in the cell stack become unnecessary and a cell stack composed of a compact system is obtained. Further, as cooling water is not used, there is no possibility for freezing even in a cold area wherein the temperature drops below 0° C., and a highly reliable cell stack can be obtained. Furthermore, as a metallic separator has a better gas sealing performance than a carbon which is a porous material, a thinner separator can be obtained than the separator made of carbon. As a result, a cell stack can be made more compact in size.

Further, cooling water is generally used for humidifying gas that is not yet reacted. But as the cell stack in this embodiment is of air cooling type with no cooling water, cooling water is not used for humidification. However, the cell stack has a self humidifying portion, and it is therefore not required to newly install a source of water for humidification, and a tank, pump, etc. become unnecessary. As a result, it becomes possible to make a cell stack in a compact size.

Figure 3:
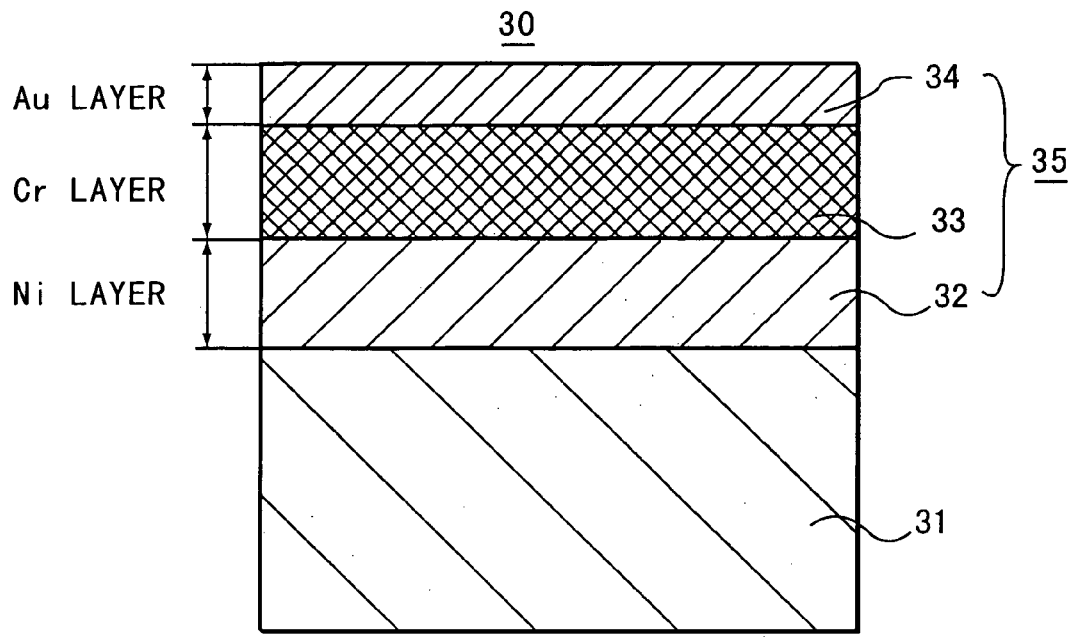
FIG. 3 is a vertical sectional view schematically showing a part of a separator formed with a multi-coating layer according to the plating process in a second embodiment of the present invention.
Figure 4:
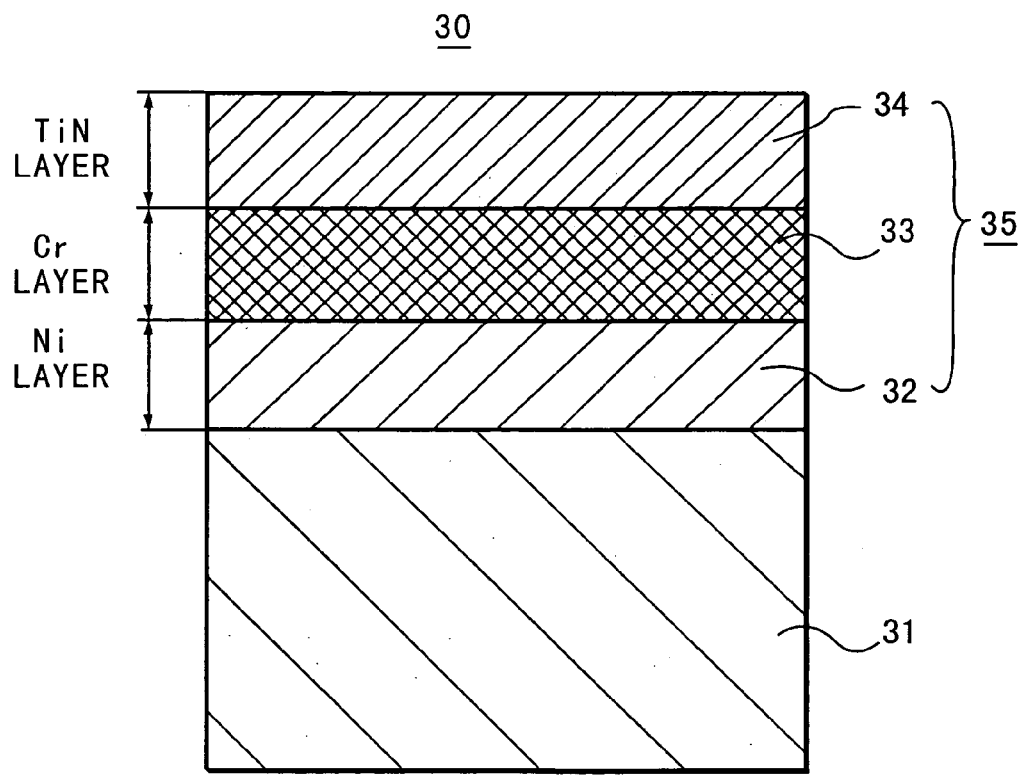
FIG. 4 is a vertical sectional view schematically showing a part of a separator formed with a multi-coating layer according to the physical evaporation process in the second embodiment of the present invention.

Second Embodiment (FIG. 3 ~FIG. 4; Table 1~Table 3)

Hereinafter, a second embodiment of this invention will be described with reference to FIGS. 3 and 4 and TABLEs 1–3. In this embodiment, an optimum film thickness of each of the low electric resistance layer, the corrosion resistance layer and the peeling resistance layer according to the electric plating process or the physical evaporation process was decided.

Example 1 (FIG. 3; Table 1)

In this example, a low electric resistance layer, a corrosion resistance layer and a peeling resistance layer were coated on an SUS 316L substrate according to the electric plating process, and thereby Separator Test Pieces No. 1~No. 64 were provided. Then the corrosion test was conducted for each of Separator Test Pieces No. 1~No. 64, and an optimum thickness of each layer was decided.

FIG. 3 is a vertical sectional view schematically showing a part of a separator provided with the multi-coating layer by the electric plating process.

As shown in FIG. 3, separator 30 has coating layer 35 coated on separator substrate 31. Coating layer 35 is composed of peeling resistance layer 32 using Ni, corrosion resistance layer 33 using Cr and low electric resistance layer 34 using Au.

On Test Pieces No. 1~No. 64, the thickness of the Au layer that is low electric resistance layer 34 was changed from 0.01 to 0.04 μm, the thickness of the Cr layer that is corrosion resistance layer 33 was changed from 0.05 to 0.20 μm, and further, the thickness of the Ni layer that is peeling resistance layer 32 was changed from 0.05 to 0.20 μm.

TABLE 1

| Test Piece No. | Low Electric Resistance Layer Thickness (μm) | Corrosion | Corrosion Resistance Layer Thickness (μm) | Corrosion | Peeling Resistance Layer Thickness (μm) | Corrosion |
|---|---|---|---|---|---|---|
| 1 | 0.01 | Yes | 0.05 | Yes | 0.05 | Yes |
| 2 | 0.01 | Yes | 0.05 | Yes | 0.10 | No |
| 3 | 0.01 | Yes | 0.05 | Yes | 0.15 | No |
| 4 | 0.01 | Yes | 0.05 | Yes | 0.20 | No |
| 5 | 0.01 | Yes | 0.10 | Yes | 0.05 | Yes |
| 6 | 0.01 | Yes | 0.10 | No | 0.10 | No |
| 7 | 0.01 | Yes | 0.10 | No | 0.15 | No |
| 8 | 0.01 | Yes | 0.10 | No | 0.20 | No |
| 9 | 0.01 | Yes | 0.15 | No | 0.05 | No |
| 10 | 0.01 | Yes | 0.15 | No | 0.10 | No |
| 11 | 0.01 | Yes | 0.15 | No | 0.15 | No |
| 12 | 0.01 | Yes | 0.15 | No | 0.20 | No |
| 13 | 0.01 | Yes | 0.20 | No | 0.05 | No |
| 14 | 0.01 | Yes | 0.20 | No | 0.10 | No |
| 15 | 0.01 | Yes | 0.20 | No | 0.15 | No |
| 16 | 0.01 | Yes | 0.20 | No | 0.20 | No |
| 17 | 0.02 | No | 0.05 | No | 0.05 | No |
| 18 | 0.02 | No | 0.05 | No | 0.10 | No |
| 19 | 0.02 | No | 0.05 | No | 0.15 | No |
| 20 | 0.02 | No | 0.05 | No | 0.20 | No |
| 21 | 0.02 | No | 0.10 | No | 0.05 | No |
| 22 | 0.02 | No | 0.10 | No | 0.10 | No |
| 23 | 0.02 | No | 0.10 | No | 0.15 | No |
| 24 | 0.02 | No | 0.10 | No | 0.20 | No |
| 25 | 0.02 | No | 0.15 | No | 0.05 | No |
| 26 | 0.02 | No | 0.15 | No | 0.10 | No |
| 27 | 0.02 | No | 0.15 | No | 0.15 | No |
| 28 | 0.02 | No | 0.15 | No | 0.20 | No |
| 29 | 0.02 | No | 0.20 | No | 0.05 | No |
| 30 | 0.02 | No | 0.20 | No | 0.10 | No |
| 31 | 0.02 | No | 0.20 | No | 0.15 | No |
| 32 | 0.02 | No | 0.20 | No | 0.20 | No |
| 33 | 0.03 | No | 0.05 | No | 0.05 | No |
| 34 | 0.03 | No | 0.05 | No | 0.10 | No |
| 35 | 0.03 | No | 0.05 | No | 0.15 | No |
| 36 | 0.03 | No | 0.05 | No | 0.20 | No |
| 37 | 0.03 | No | 0.10 | No | 0.05 | No |
| 38 | 0.03 | No | 0.10 | No | 0.10 | No |
| 39 | 0.03 | No | 0.10 | No | 0.15 | No |
| 40 | 0.03 | No | 0.10 | No | 0.20 | No |
| 41 | 0.03 | No | 0.15 | No | 0.05 | No |
| 42 | 0.03 | No | 0.15 | No | 0.10 | No |
| 43 | 0.03 | No | 0.15 | No | 0.15 | No |
| 44 | 0.03 | No | 0.15 | No | 0.20 | No |
| 45 | 0.03 | No | 0.20 | No | 0.05 | No |
| 46 | 0.03 | No | 0.20 | No | 0.10 | No |
| 47 | 0.03 | No | 0.20 | No | 0.15 | No |
| 48 | 0.03 | No | 0.20 | No | 0.20 | No |
| 49 | 0.04 | No | 0.05 | No | 0.05 | No |
| 50 | 0.04 | No | 0.05 | No | 0.10 | No |
| 51 | 0.04 | No | 0.05 | No | 0.15 | No |
| 52 | 0.04 | No | 0.05 | No | 0.20 | No |
| 53 | 0.04 | No | 0.10 | No | 0.05 | No |
| 54 | 0.04 | No | 0.10 | No | 0.10 | No |
| 55 | 0.04 | No | 0.10 | No | 0.15 | No |
| 56 | 0.04 | No | 0.10 | No | 0.20 | No |
| 57 | 0.04 | No | 0.15 | No | 0.05 | No |
| 58 | 0.04 | No | 0.15 | No | 0.10 | No |
| 59 | 0.04 | No | 0.15 | No | 0.15 | No |
| 60 | 0.04 | No | 0.15 | No | 0.20 | No |
| 61 | 0.04 | No | 0.20 | No | 0.05 | No |
| 62 | 0.04 | No | 0.20 | No | 0.10 | No |
| 63 | 0.04 | No | 0.20 | No | 0.15 | No |
| 64 | 0.04 | No | 0.20 | No | 0.20 | No |

An anode electrode was formed with an anode catalytic layer and the anode separator made of each of Separator Test Pieces No. 1~No. 64, and a cathode electrode was formed with a cathode catalytic layer and a cathode separator made of each of Separator Test Pieces No. 1~No. 64. Using these electrodes, hydrogen was supplied to the anode electrode and air was supplied to the cathode electrode. The hydrogen supplied to the anode electrode was ionized into hydrogen ion and electron in the anode catalytic layer. The hydrogen ion was moved to the cathode electrode through a solid polymer membrane and electron was moved to the cathode electrode through an external circuit. The oxygen contained in the air supplied to the cathode electrode reacted with the hydrogen ion and the electron in the cathode catalytic layer thereby to generate water. The electrons passed through the external circuit became a current and generated electric power.

The corrosion test condition is as follows: Power generating voltage is 0.6V, and test time is 200 hours. The corrosion generating state of the coating film on the most outer surface of the separator was checked after the corrosion test. The result of the corrosion test is shown in Table 1.

As shown in Table 1, the corrosion was not generated on the coating film of the most outer surface of the separator in the corrosion test only when the film thickness of the low electric resistance layer 34 was made not less than 0.02 μm, that of the corrosion resistance layer 33 was made not less than 0.1 μm and that of the peeling resistance layer 32 was made not less than 0.1 μm. In the case of the separator of other film thickness, the corrosion was generated on the coating film of the most outer surface of the separator.

Example 2 (FIG. 4; Table 2)

In this example, a low electric resistance layer, a corrosion resistance layer and a peeling resistance layer were coated on an SUS 316L substrate according to an arc discharging type ion plating process which is one of the physical evaporation process, and Separator Test Pieces No. 1 ~No. 64 were provided. Then the corrosion test was conducted for each of Separator Test Pieces No. 1~No. 64, and an optimum thickness of each layer was decided.

FIG. 4 is a vertical sectional view schematically showing a part of the separator provided with the multi-coating layer by the physical evaporation process.

As shown in FIG. 4, separator 30 has coating layer 35 coated on separator substrate 31. Coating layer 35 is composed of peeling resistance layer 32 using Ni, corrosion resistance layer 33 using Cr and low electric resistance layer 34 using TiN.

On Test Piece No. 1~No. 64, the thickness of the TiN layer that was low electric resistance layer 34, the thickness of the Cr layer that was the corrosion resistance layer 33 and the thickness of the Ni layer that was peeling resistance layer 32 were respectively changed from 0.5 to 0.2 μm.

TABLE 2

| Test Piece No. | Low Electric Resistance Layer Thickness (μm) | Corrosion | Corrosion Resistance Layer Thickness (μm) | Corrosion | Peeling Resistance Layer Thickness (μm) | Corrosion |
|---|---|---|---|---|---|---|
| 1 | 0.5 | Yes | 0.5 | Yes | 0.5 | Yes |
| 2 | 0.5 | Yes | 0.5 | Yes | 1.0 | No |
| 3 | 0.5 | Yes | 0.5 | Yes | 1.5 | No |
| 4 | 0.5 | Yes | 0.5 | Yes | 2.0 | No |
| 5 | 0.5 | Yes | 1.0 | No | 0.5 | No |
| 6 | 0.5 | Yes | 1.0 | No | 1.0 | No |
| 7 | 0.5 | Yes | 1.0 | No | 1.5 | No |
| 8 | 0.5 | Yes | 1.0 | No | 2.0 | No |
| 9 | 0.5 | Yes | 1.5 | No | 0.5 | No |
| 10 | 0.5 | Yes | 1.5 | No | 1.0 | No |
| 11 | 0.5 | Yes | 1.5 | No | 1.5 | No |
| 12 | 0.5 | Yes | 1.5 | No | 2.0 | No |
| 13 | 0.5 | Yes | 2.0 | No | 0.5 | No |
| 14 | 0.5 | Yes | 2.0 | No | 1.0 | No |
| 15 | 0.5 | Yes | 2.0 | No | 1.5 | No |
| 16 | 0.5 | Yes | 2.0 | No | 2.0 | No |
| 17 | 1.0 | No | 0.5 | No | 0.5 | No |
| 18 | 1.0 | No | 0.5 | No | 1.0 | No |
| 19 | 1.0 | No | 0.5 | No | 1.5 | No |
| 20 | 1.0 | No | 0.5 | No | 2.0 | No |
| 21 | 1.0 | No | 1.0 | No | 0.5 | No |
| 22 | 1.0 | No | 1.0 | No | 1.0 | No |
| 23 | 1.0 | No | 1.0 | No | 1.5 | No |
| 24 | 1.0 | No | 1.0 | No | 2.0 | No |
| 25 | 1.0 | No | 1.5 | No | 0.5 | No |
| 26 | 1.0 | No | 1.5 | No | 1.0 | No |
| 27 | 1.0 | No | 1.5 | No | 1.5 | No |
| 28 | 1.0 | No | 1.5 | No | 2.0 | No |
| 29 | 1.0 | No | 2.0 | No | 0.5 | No |
| 30 | 1.0 | No | 2.0 | No | 1.0 | No |
| 31 | 1.0 | No | 2.0 | No | 1.5 | No |
| 32 | 1.0 | No | 2.0 | No | 2.0 | No |
| 33 | 1.5 | No | 0.5 | No | 0.5 | No |
| 34 | 1.5 | No | 0.5 | No | 1.0 | No |
| 35 | 1.5 | No | 0.5 | No | 1.5 | No |
| 36 | 1.5 | No | 0.5 | No | 2.0 | No |
| 37 | 1.5 | No | 1.0 | No | 0.5 | No |
| 38 | 1.5 | No | 1.0 | No | 1.0 | No |
| 39 | 1.5 | No | 1.0 | No | 1.5 | No |
| 40 | 1.5 | No | 1.0 | No | 2.0 | No |
| 41 | 1.5 | No | 1.5 | No | 0.5 | No |
| 42 | 1.5 | No | 1.5 | No | 1.0 | No |
| 43 | 1.5 | No | 1.5 | No | 1.5 | No |
| 44 | 1.5 | No | 1.5 | No | 2.0 | No |
| 45 | 1.5 | No | 2.0 | No | 0.5 | No |
| 46 | 1.5 | No | 2.0 | No | 1.0 | No |
| 47 | 1.5 | No | 2.0 | No | 1.5 | No |
| 48 | 1.5 | No | 2.0 | No | 2.0 | No |
| 49 | 2.0 | No | 0.5 | No | 0.5 | No |
| 50 | 2.0 | No | 0.5 | No | 1.0 | No |
| 51 | 2.0 | No | 0.5 | No | 1.5 | No |
| 52 | 2.0 | No | 0.5 | No | 2.0 | No |
| 53 | 2.0 | No | 1.0 | No | 0.5 | No |
| 54 | 2.0 | No | 1.0 | No | 1.0 | No |
| 55 | 2.0 | No | 1.0 | No | 1.5 | No |
| 56 | 2.0 | No | 1.0 | No | 2.0 | No |
| 57 | 2.0 | No | 1.5 | No | 0.5 | No |
| 58 | 2.0 | No | 1.5 | No | 1.0 | No |
| 59 | 2.0 | No | 1.5 | No | 1.5 | No |
| 60 | 2.0 | No | 1.5 | No | 2.0 | No |
| 61 | 2.0 | No | 2.0 | No | 0.5 | No |
| 62 | 2.0 | No | 2.0 | No | 1.0 | No |
| 63 | 2.0 | No | 2.0 | No | 1.5 | No |
| 64 | 2.0 | No | 2.0 | No | 2.0 | No |

A corrosion test was conducted using each of Test Pieces No. 1~No. 64 shown in Table 2. Further, the corrosion test condition is the same as those for the Example 1. The results of corrosion test are shown in Table 2.

As shown in Table 2, the corrosion was not generated on the film of the most outer surface of the separator in the corrosion test only when the film thickness of low electric resistance layer 34 was made not less than 1.0 μm, that of corrosion resistance layer 33 was made not less than 1.0 μm and that of peeling resistance layer 32 was made not less then 1.0 μm. In the case of the separator of other film thickness, the corrosion was generated on the coating film of the most outer surface of the separator.

Then, an X-ray analysis was conducted on coating layer 35 of the separator obtained in Example 2.

Table 3 shows the crystal orientation of coating layer 35 formed according to the physical evaporation process.

TABLE 3

| Test Piece No. | Low Electric Resistance Layer Thickness (μm) | Corrosion | Crystal Orientation | Corrosion Resistance Layer Thickness (μm) | Corrosion | Crystal Orientation |
|---|---|---|---|---|---|---|
| 1 | 0.5 | Yes | (111), (200) | 0.5 | Yes | (111), (002) |
| 2 | 0.5 | Yes | (111), (200) | 0.5 | Yes | (111), (002) |
| 3 | 0.5 | Yes | (111), (200) | 0.5 | Yes | (111), (002) |
| 4 | 0.5 | Yes | (111), (200) | 0.5 | Yes | (111), (002) |
| 5 | 0.5 | Yes | (111), (200) | 1.0 | No | (200), (002) |
| 6 | 0.5 | Yes | (111), (200) | 1.0 | No | (200), (002) |
| 7 | 0.5 | Yes | (111), (200) | 1.0 | No | (200), (002) |
| 8 | 0.5 | Yes | (111), (200) | 1.0 | No | (200), (002) |
| 9 | 0.5 | Yes | (111), (200) | 1.5 | No | (200), (002) |
| 10 | 0.5 | Yes | (111), (200) | 1.5 | No | (200), (002) |
| 11 | 0.5 | Yes | (111), (200) | 1.5 | No | (200), (002) |
| 12 | 0.5 | Yes | (111), (200) | 1.5 | No | (200), (002) |
| 13 | 0.5 | Yes | (111), (200) | 2.0 | No | (200), (002) |
| 14 | 0.5 | Yes | (111), (200) | 2.0 | No | (200), (002) |
| 15 | 0.5 | Yes | (111), (200) | 2.0 | No | (200), (002) |
| 16 | 0.5 | Yes | (111), (200) | 2.0 | No | (200), (002) |
| 17 | 1.0 | No | (200), (002) | 0.5 | No | (200), (002) |
| 18 | 1.0 | No | (200), (002) | 0.5 | No | (200), (002) |
| 19 | 1.0 | No | (200), (002) | 0.5 | No | (200), (002) |
| 20 | 1.0 | No | (200), (002) | 0.5 | No | (200), (002) |
| 21 | 1.0 | No | (200), (002) | 1.0 | No | (200), (002) |
| 22 | 1.0 | No | (200), (002) | 1.0 | No | (200), (002) |
| 23 | 1.0 | No | (200), (002) | 1.0 | No | (200), (002) |
| 24 | 1.0 | No | (200), (002) | 1.0 | No | (200), (002) |
| 25 | 1.0 | No | (200), (002) | 1.5 | No | (200), (002) |
| 26 | 1.0 | No | (200), (002) | 1.5 | No | (200), (002) |
| 27 | 1.0 | No | (200), (002) | 1.5 | No | (200), (002) |
| 28 | 1.0 | No | (200), (002) | 1.5 | No | (200), (002) |
| 29 | 1.0 | No | (200), (002) | 2.0 | No | (200), (002) |
| 30 | 1.0 | No | (200), (002) | 2.0 | No | (200), (002) |
| 31 | 1.0 | No | (200), (002) | 2.0 | No | (200), (002) |
| 32 | 1.0 | No | (200), (002) | 2.0 | No | (200), (002) |

TABLE 3-continued

| Test Piece No. | Peeling Resistance Layer Thickness (μm) | Corrosion | Crystal Orientation |
|---|---|---|---|
| 1 | 0.5 | Yes | (111), (002) |
| 2 | 1.0 | No | (200), (002) |
| 3 | 1.5 | No | (200), (002) |
| 4 | 2.0 | No | (200), (002) |
| 5 | 0.5 | No | (200), (002) |
| 6 | 1.0 | No | (200), (002) |
| 7 | 1.5 | No | (200), (002) |
| 8 | 2.0 | No | (200), (002) |
| 9 | 0.5 | No | (200), (002) |
| 10 | 1.0 | No | (200), (002) |
| 11 | 1.5 | No | (200), (002) |
| 12 | 2.0 | No | (200), (002) |
| 13 | 0.5 | No | (200), (002) |
| 14 | 1.0 | No | (200), (002) |
| 15 | 1.5 | No | (200), (002) |
| 16 | 2.0 | No | (200), (002) |
| 17 | 0.5 | No | (200), (002) |
| 18 | 1.0 | No | (200), (002) |
| 19 | 1.5 | No | (200), (002) |
| 20 | 2.0 | No | (200), (002) |
| 21 | 0.5 | No | (200), (002) |
| 22 | 1.0 | No | (200), (002) |
| 23 | 1.5 | No | (200), (002) |
| 24 | 2.0 | No | (200), (002) |
| 25 | 0.5 | No | (200), (002) |
| 26 | 1.0 | No | (200), (002) |
| 27 | 1.5 | No | (200), (002) |
| 28 | 2.0 | No | (200), (002) |
| 29 | 0.5 | No | (200), (002) |
| 30 | 1.0 | No | (200), (002) |
| 31 | 1.5 | No | (200), (002) |
| 32 | 2.0 | No | (200), (002) |

As shown in Table 3, almost all of the crystal orientations of the films that showed excellent corrosion resistance oriented to the direction of Miller index (200) or (002).

On the other hand, almost all of the crystal orientations of the corroded films were the crystal orientation plane wherein Miller indices (111), (200) and (002) were mixed.

According to this embodiment, when the film thickness of low electric resistance layer 34 is made not less than 0.02 μm, that of corrosion resistance layer 33 is made not lee than 0.1 μm and that of peeling resistance layer 32 is made not less than 0.1 μm according to the plating process, or the film thickness of low electric resistance layer 34 is made not less than 1.0 μm, that of corrosion resistance layer is made not less than 1.0 μm and that of peeling resistance layer 32 is made not less than 1.0 μm according to the physical evaporation process, it is possible to lower electric contact resistance of the separator that is an important cell performance and to minimize voltage drop due to resistance of the unit cell. Further, it is possible to intercept corrosion factors, such as oxygen, corrosion products, etc., entering through air holes existing in low electric resistance layer 34 to a minimum level. Further, as it is possible to prevent the peeling of the film and the performance drop of separator substrate 31 due to corrosion, highly reliable coating layer 35 can be formed.

Further, when the crystal direction of coating layer 35 is oriented to the direction of Miller index (200) or (002), peeling resistance and corrosion resistance in the severe environment, such as the corrosion for a long time and the corrosion caused by potential difference specific to the fuel cell, can be obtained. Further, when the crystal orientations are made in the same direction, it is possible to lower electric contact resistance, to make current density in the coating film uniform and to minimize voltage drop caused by the resistance of the unit cell.

Figure 5:
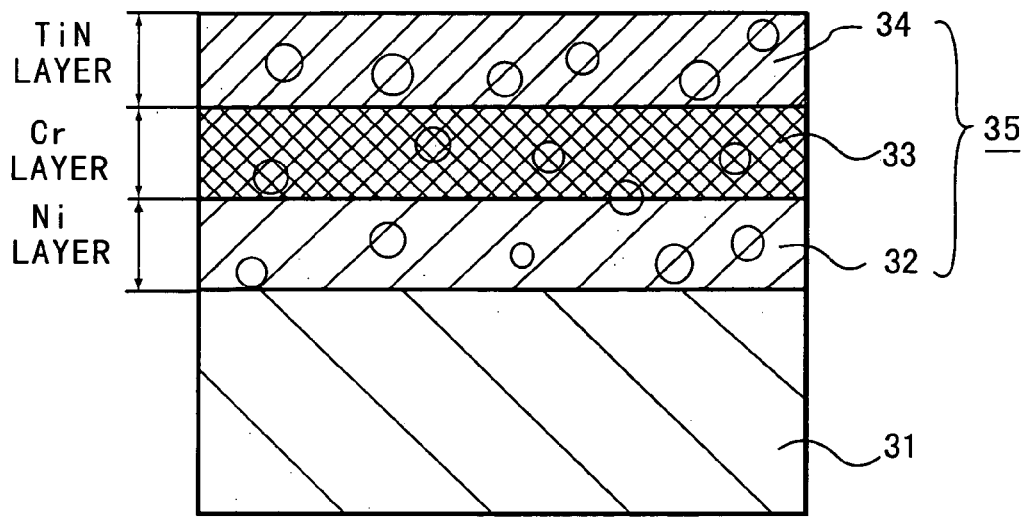
FIG. 5 is a sectional view showing defective area rate of a film of a proton exchange fuel cell in a third embodiment of the present invention.
Figure 6:
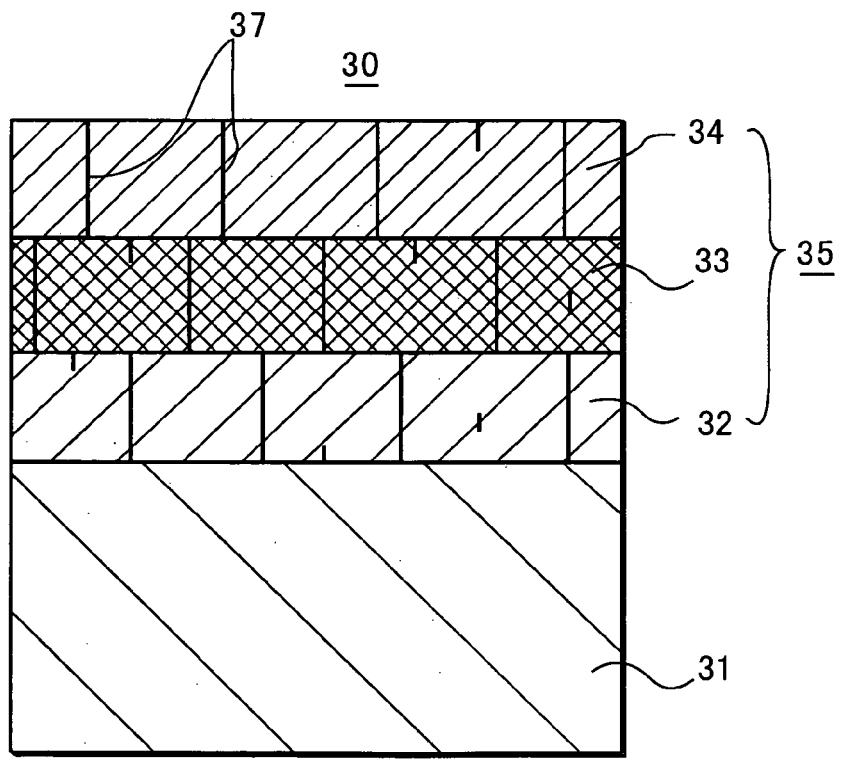
FIG. 6 is a sectional view showing that continuously penetrating air holes were intercepted in a separator of a proton exchange fuel cell in the third embodiment of the present invention.

Third Embodiment (FIG. 5 ~FIG. 6; Table 4)

Hereinafter, a third embodiment of this invention will be described with reference to FIGS. 5 and 6 and TABLE 4. In this embodiment, it is explained that the defective area rate of the coating layer is specified not more than $5 \times 10^0\%$.

In this embodiment, a separator is made of SUS 316L substrate with the multi-coating layer formed on 1 μm by the physical evaporation method was used. A part of the vertical sectional view of this separator is schematically shown in FIG. 5.

As shown in FIG. 5, separator 30 has the coating layer 35 formed on the separator substrate made of SUS 316L. This coating layer 35 is composed of peeling resistance layer 32 using Ni, corrosion resistance layer 33 using Cr and low electric resistance layer 34 using Tin.

Then, by changing porosity of coating layer 35, Test Pieces 1~10 were provided as shown in Table 4. As for the porosity in coating layer 35, the result measured according to the critical passive state current density method was shown by defective area rate. Specifically, the defective area rate is a value obtained by dividing a critical passive state current density of a separator with the coating layer by a critical passive state current density of a separator without the coating layer.

A corrosion test was conducted using each of Test Pieces 1~10. Further, the corrosion test condition was the same as that shown in Example 1 in the second embodiment. The result of the corrosion test is shown in Table 4.

TABLE 4

| Test Piece No. | Film | Defective Area Rate | Corrosion |
|---|---|---|---|
| 1 | TiN/Cr/Ni | $10^2$ | Yes |
| 2 | TiN/Cr/Ni | $5 \times 10^2$ | Yes |
| 3 | TiN/Cr/Ni | $10^1$ | Yes |
| 4 | TiN/Cr/Ni | $5 \times 10^1$ | Yes |
| 5 | TiN/Cr/Ni | $10^0$ | Yes |
| 6 | TiN/Cr/Ni | $5 \times 10^0$ | No |
| 7 | TiN/Cr/Ni | $10^{-1}$ | No |
| 8 | Tin/Cr/Ni | $5 \times 10^{-1}$ | No |
| 8 | TiN/Cr/Ni | $10^{-2}$ | No |
| 9 | TiN/Cr/Ni | $5 \times 10^{-2}$ | No |
| 10 | TiN/Cr/Ni | $10^{-3}$ | No |

As shown in Table 4, in this corrosion test, no corrosion was generated on the surface film of coating layer 35 of which porosity in terms of defective area rate not more than $5 \times 10^0\%$ (Test Piece Nos. 6–10). Corrosion was generated on the surface film of the coating layer 35 with other defective area rates (Test Piece Nos. 1–5). This is because the corrosion progressed through air holes existing in the film, and metallic ions of separator substrate 31 flowed out to the surface to cause the corrosion.

Therefore, when porosity of coating layer 35 in terms of defective area rate is set not more than $5 \times 10^0\%$, corrosion factors entering through air holes, such as oxygen and corrosion products, etc., can be intercepted to the minimum. Accordingly, it becomes possible to improve peeling resistance and corrosion resistance in such severe environments as the corrosion resulting from saturated steam of 70~90° C. for a long time, and the corrosion resulting from potential difference specific to the fuel cell. As a result, it is possible to prevent the peeling of the film and performance drop of separator substrate 31 caused by the corrosion. Further, even when a separator is provided with coating layer 35 composed of the Au layer, Cr layer and Ni layer according to the plating process, it is necessary to set the porosity in terms of defective area rate of the coating layer 35 not more than $5 \times 10^0\%$.

FIG. 6 is a vertical sectional view schematically showing a part of the separator which intercepts continuous air holes penetrating to the interface of the coating layer with the separator substrate by providing the coating layer.

As shown in FIG. 6, even when there are air holes 37 in low electric resistance layer 34, if there is no air hole penetrating through its lower corrosion resistance layer 33, corrosion factors entering through air holes 37, such as oxygen and corrosion products, etc., can be intercepted on the surface layer of corrosion resistance layer 33. Further, even when there are air holes 37 in low electric resistance layer 34 continuously penetrating through its lower corrosion resistance layer 33, if there is no air hole penetrating through its lower peeling resistance layer 32, corrosion factors entering through air holes 37, such as oxygen and corrosion products, etc., can be intercepted on the surface layer of peeling resistance layer 32.

Thus, by intercepting corrosion factors entering through air holes 37, such as oxygen and corrosion products, etc., to a minimum, it becomes possible to improve peeling resistance and corrosion resistance in such severe environments as the corrosion resulting from saturated steam of 70~90° C. for a long time, and the corrosion resulting from potential difference specific to the fuel cell. As a result, it is possible to prevent the peeling of the film and performance drop of separator substrate 31 caused by the corrosion. Further, it is possible to prevent the electrical short circuit of the cathode with the anode by lowering metallic ions flowed out in cooling medium or saturated steam.

Figure 7:
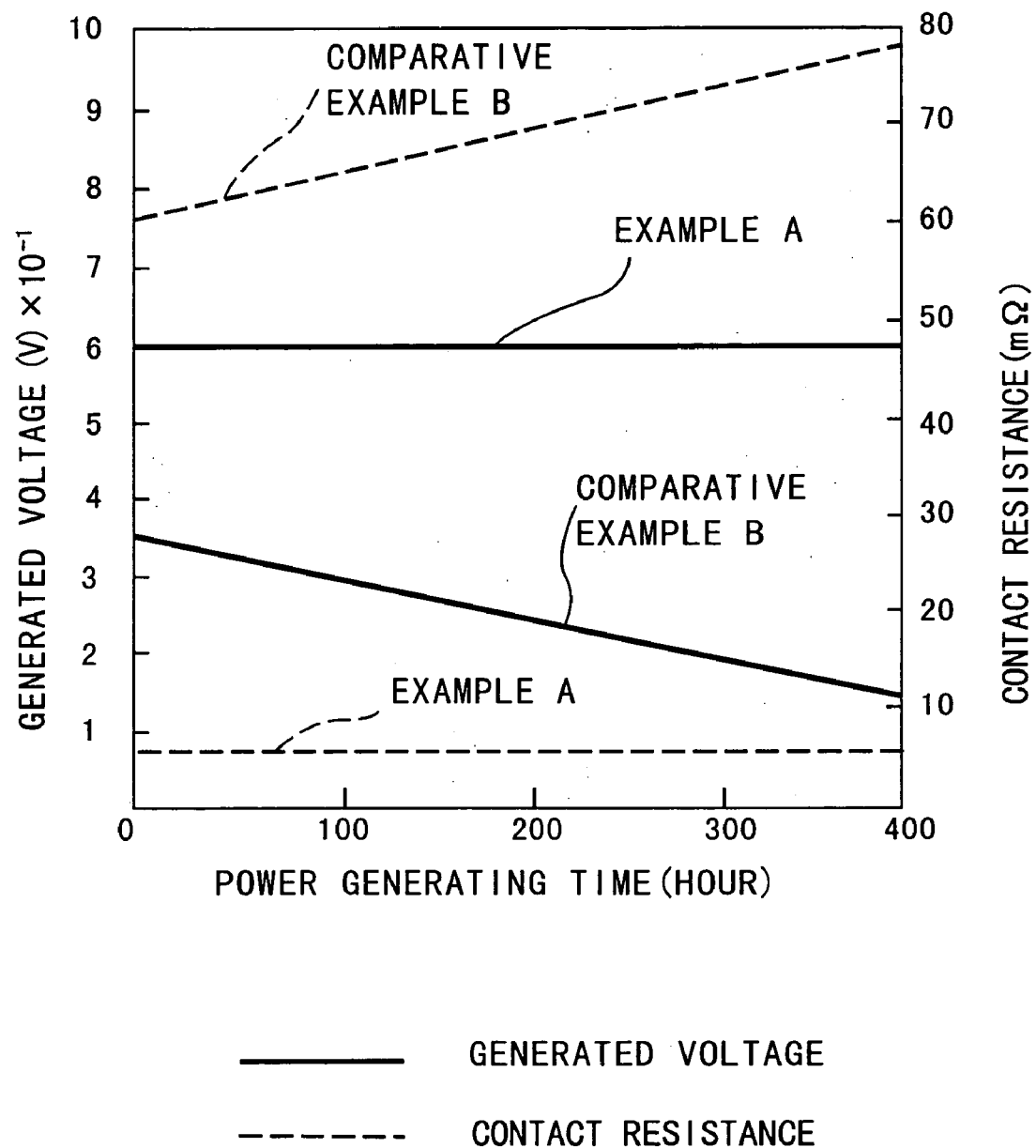
FIG. 7 is a diagram showing the comparison of the performance between a separator of Example A and a separator of Comparative Example B in a fourth embodiment of the present invention.

Fourth Embodiment (FIG. 7)

Hereinafter, a fourth embodiment of this invention will be described with reference to FIG. 7. In this embodiment, it is explained that the voltage drop and contact resistance increase in the cell power generation can be prevented by forming a multi-coating layer on the separator substrate.

Using the ion plating process, a multi-coating layer composed of TiN layer and Cr layer was formed on a separator substrate to provide a separator. Using these separators, a proton exchange fuel cell stack was formed and was referred to as an Example A.

On the other hand, a separator composed of a separator substrate made of SUS 316l base material of which surface was not coating processed was provided. Using these separators, a proton exchange fuel cell stack was formed and was referred to as a Comparative Example B.

Using Example A and Comparative Example B, the voltage drop and contact resistance change in the cell power generation were compared. The results are shown in FIG. 7.

As clear from FIG. 7, the generated voltage of Example A applied with the multi-coating is $6 \times 10^{-1}$V at the initial stage, as shown by the solid line, and no voltage drop is recognized after the power generating time of 400 hours. On the other hand, the generated voltage of Comparative Example B applied with no coating process was $3.5 \times 10^{-1}$V at the initial stage, as shown by the solid line, and generated voltage tends to drop with the elapse of the generating time. This indicated that passive state film, such as oxide and corrosion products, etc., was formed on the surface of the separator substrate, and thereby the contact resistance of the separator increased and generating voltage dropped.

Further, contact resistance of Example A applied with the multi-coating is not more than 10 mΩ cm² and keeps a low value as shown by the broken line. On the other hand, contact resistance of Comparative Example B with no coating process applied is 60 mΩ cm² at the initial stage and increases to a high value of 80 mΩ cm² with the elapse of generating time as shown by the broken line.

Therefore, according to this embodiment, it is possible to prevent the voltage drop and increase of contact resistance when the surface of the separator substrate is formed with a multi-coating layer of the materials having low contact resistance.

By the way, a proton exchange fuel cell stack is required to operate satisfactorily in a peripheral environment of a low temperature below 0° C. depending on its use. In the case where water is used as a cooling medium in the fuel cell, the water in the fuel cell may be frozen when the fuel cell is not operating. In this case, a cell stack may possibly be destructed by the expansion of water when frozen, especially at locations where water is closed, such as in a cooling water manifold or the groove flow line of the separator. A working environment for the fuel cell is in the temperature environment widely ranging from below the freezing point to a saturated steam temperature. Accordingly, when selecting separator substrate and coating material, it is important to select materials considering differences in physical properties of both materials. In particular, regarding coefficients of thermal expansion of the separator substrate and the coating material, it is necessary to use a coating material with a coefficient of thermal expansion equal to or lower than that of the separator substrate. Thus, residual compression stress acts on the coating film surface, and thereby the generation of peeling and crack of the film can be prevented.

Figure 8:
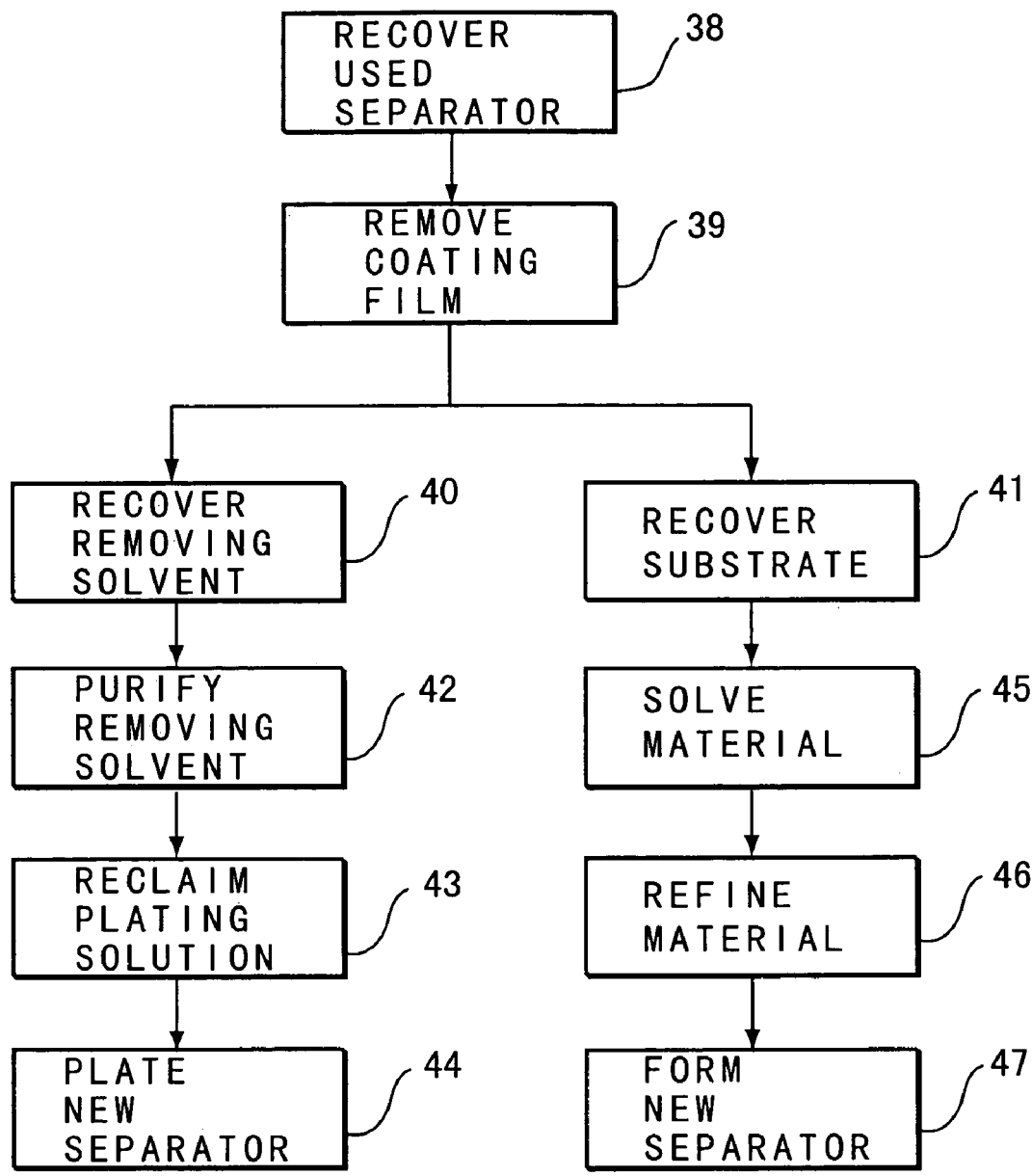
FIG. 8 is a block diagram showing the recycling of a separator of a proton exchange fuel cell in a fifth embodiment of the present invention.
Figure 9:
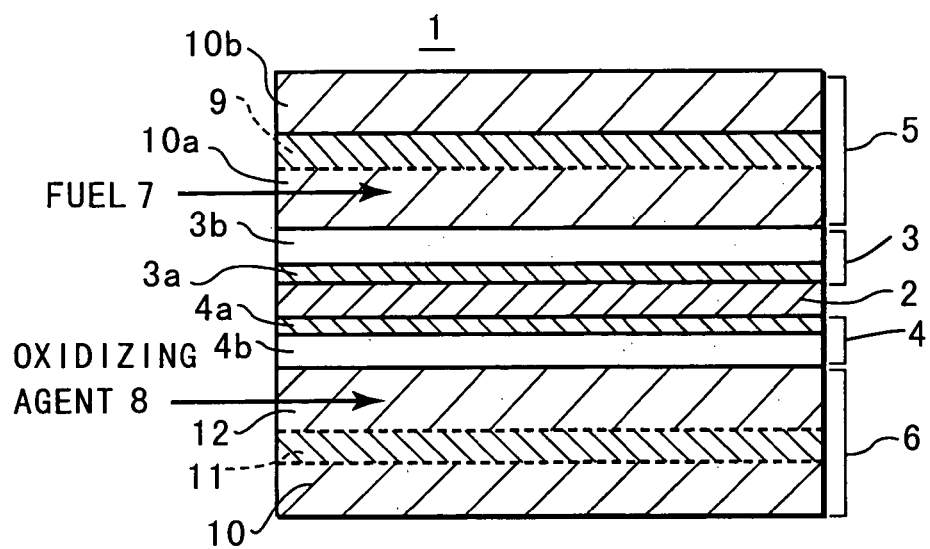
FIG. 9 is a diagram showing the structure of a conventional unit cell.
Figure 10:
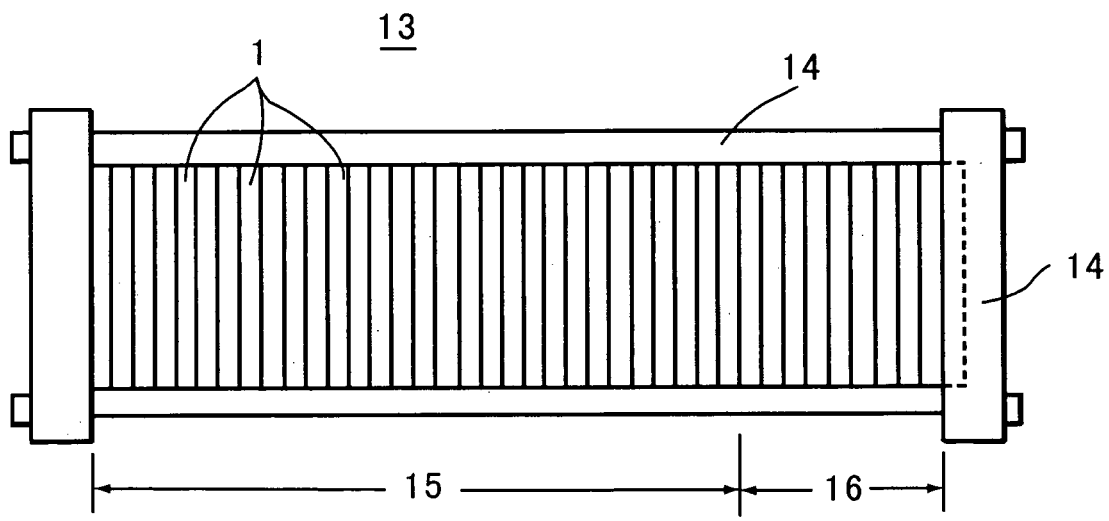
FIG. 10 is a diagram showing a conventional proton exchange fuel cell stack using carbon plates.
Figure 11:
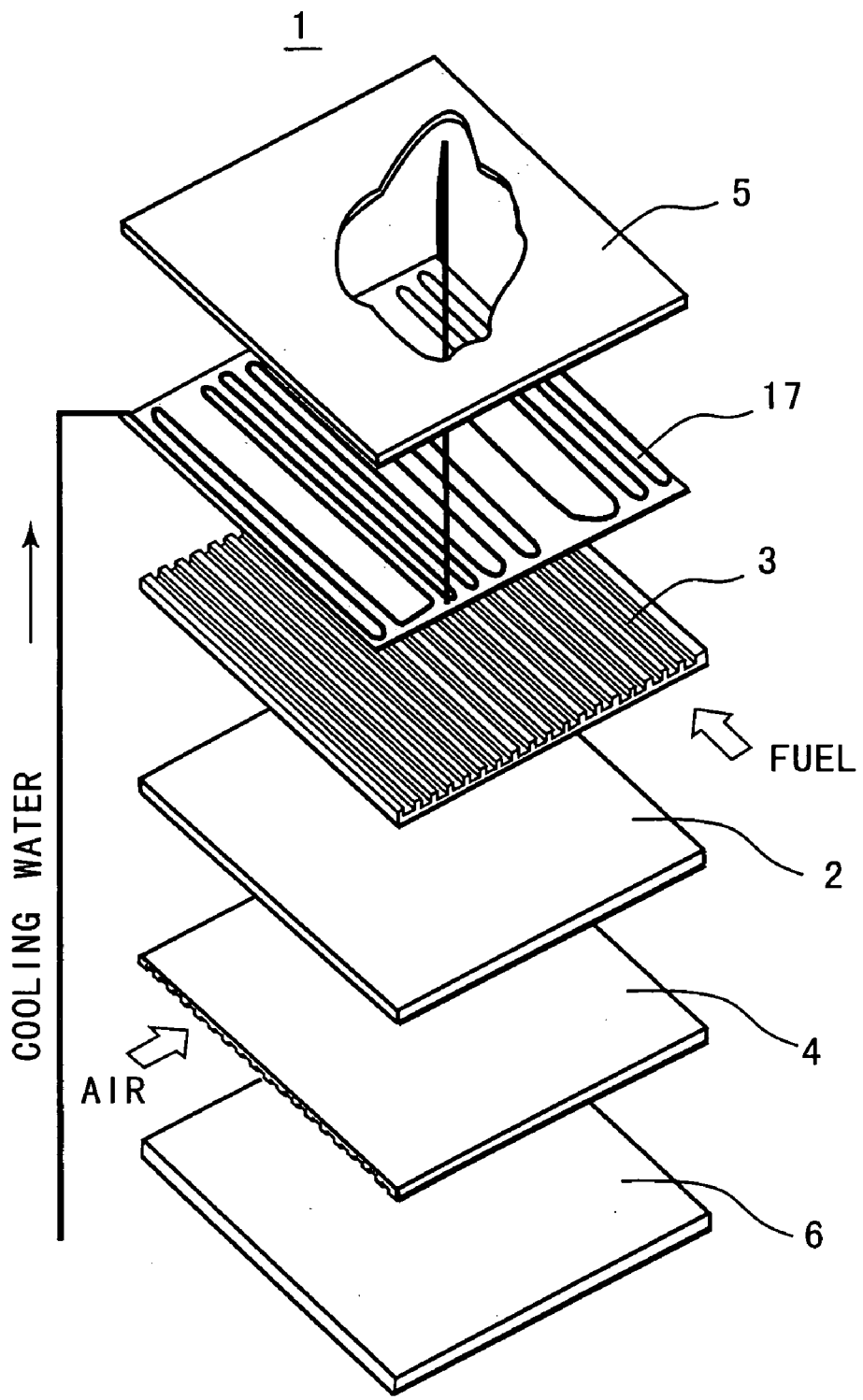
FIG. 11 is a diagram showing the structure of a unit cell in the cell portion of the conventional fuel cell shown in FIG. 10.
Figure 12:
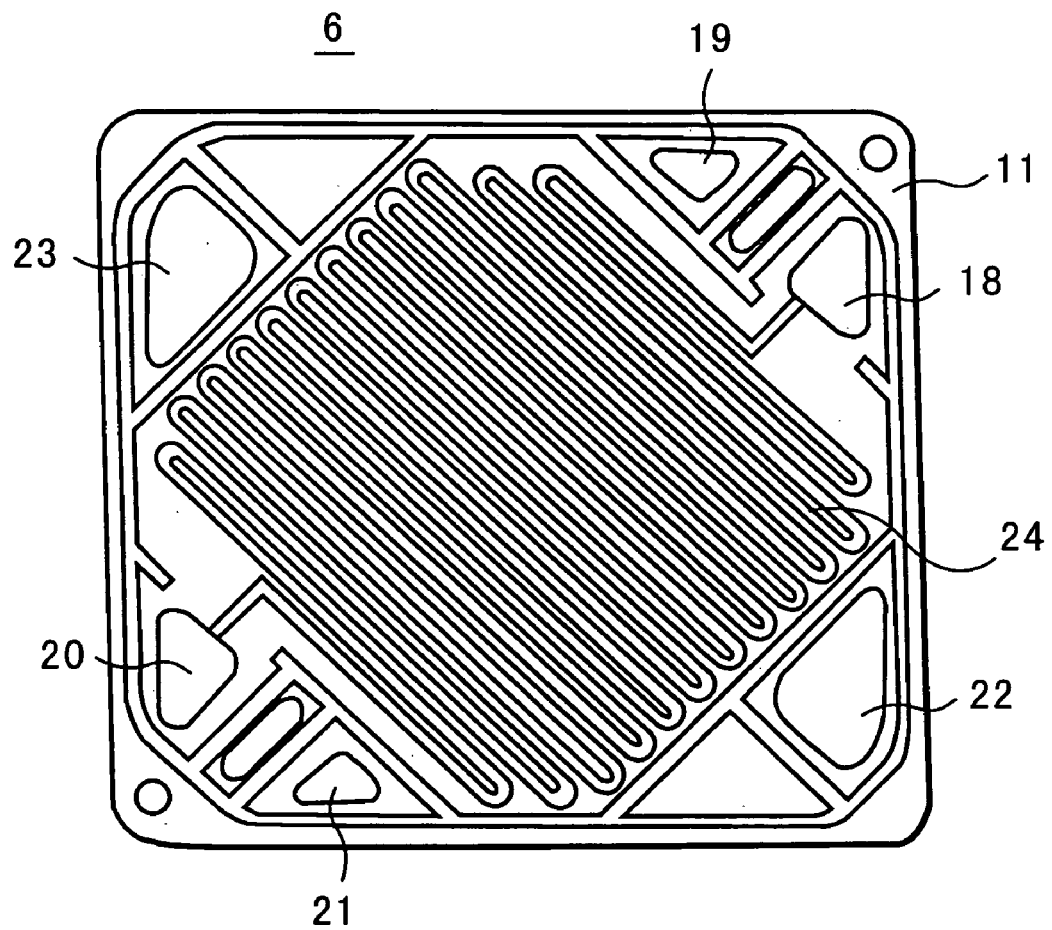
FIG. 12 is a plan view showing a conventional separator installed at the cathode electrode side.

Fifth Embodiment (FIG. 8)

Hereinafter, a fifth embodiment of this invention will be described with reference to FIG. 8. In this embodiment, separator substrates and coating layers of used separators were individually recovered and recycled.

Steps of this recovery and recycling work are shown in FIG. 8.

As shown in FIG. 8, first, after recovering a used separator (Step 38), the films of the multi-coating layer composed of the low electric resistance layer, the corrosion resistance layer and the peeling resistance layer were removed (Step 39). When removing the coating films (Step 39), a solvent capable of solving materials including metals forming the multi-coating layer was used. Further, depending on materials, this solvent was changed. Thereafter, the recovery of removing solvent (Step 40) and the recovery of substrate (41) were conducted so that the coating layers and the separator substrate were individually recovered.

After recovering the removing solvent (Step 40), the removing solvent was purified (Step 42) and reclaimed as a plating solution (Step 43). Using this plating solution again, a new separator was plated (Step 44).

On the other hand, after pulverizing the recovered separator substrate electrically, mechanically or chemically, the pulverized material was solved (Step 45) and refined (Step 46). Then, the refined material was formed to provide a new separator.

When such expensive noble metals as gold, silver, etc., were used on the low electric resistance layer, the corrosion resistance layer and the peeling resistance layer composing the multi-coating layer, it is questionable to throw away all materials from view points of exhaust of resources, environments and separator manufacturing costs. So, when coating materials are recovered electrically, mechanically or chemically, reclaimed and again used as coating materials as in this embodiment, it is possible to prevent exhaust of resources, to reduce separator manufacturing costs and to provide a low price proton exchange fuel cell.

Further, the reuse of coating materials by the plating is effectual because of a high material recovery efficiency. In particular, when aluminum and its alloy, copper and its alloy materials are used for the materials of the separator substrate, material recovery efficiency is high and reuse is effective.

As described above, a separator of a proton exchange fuel cell and its manufacturing method according to this invention can provide a separator of a proton exchange fuel cell at low cost. Further, it is possible to eliminate the voltage drop due to the resistance and to prevent corrosion resulting from reaction gas or saturated steam atmosphere. Accordingly, a separator of a proton exchange fuel cell and its manufacturing method according to this invention can provide a separator of a proton exchange fuel cell in compact size and light weight. When this separator is used, a long life and highly reliable proton exchange fuel cell can be obtained.

Obviously, numerous modifications and variations of the present invention are possible in light of the above teachings. It is therefore to be understood that within the scope of the appended claims, the invention may be practiced otherwise than as specifically described herein.

What is claimed is:

1. A proton exchange fuel cell, comprising:
  a separator which comprises
  a separator substrate; and
  a multi-coating layer formed on said separator substrate;
  wherein said multi-coating layer comprises a peeling resistance layer provided on said separator substrate, a corrosion resistance layer provided on said peeling resistance layer, and a low electric resistance layer provided on said corrosion resistance layer;
  wherein a material of said low electric resistance layer has an electric resistance of equal to or lower than 1000 $\mu\Omega cm^2$;
wherein said separator substrate comprises one material or a composite material of two or more of materials selected from the group consisting of stainless steel, copper, an alloy of copper, aluminum, an alloy of aluminum, titanium and an alloy of titanium;
wherein said multi-coating layer comprises one material or a composite material of two or more materials having a low contact resistance selected from the group consisting of Ni, Fe, Co, B, Pb, Cr, Cu, Ti, Bi, Sn, W, P, Mo, Ag, Pt, Au, TiC, NbC, TiCN, TiN, CrN, $TiB_2$, $ZrB_2$, $Fe_2B$, and $Si_3N_4$;
  wherein a film thickness of said low electric resistance layer is 0.02 $\mu$m or more, a film thickness of said corrosion resistance layer is 0.1 $\mu$m or more, and a film thickness of said peeling resistance layer is 0.1 $\mu$m or more.

2. A proton exchange fuel cell, comprising:
  a separator which comprises
  a separator substrate; and
  a multi-coating layer formed on said separator substrate;
  wherein said multi-coating layer comprises a peeling resistance layer provided on said separator substrate, a corrosion resistance layer provided on said peeling resistance layer, and a low electric resistance layer provided on said corrosion resistance layer;

wherein a material of said low electric resistance layer has an electric resistance of equal to or lower than 1000 $\mu\Omega cm^2$;

wherein said separator substrate comprises one material or a composite material of two or more materials selected from the group consisting of stainless steel, copper, an alloy of copper, aluminum, an alloy of aluminum, titanium and an alloy of titanium;

wherein said multi-coating layer comprises one material or a composite material of two or more materials having a low contact resistance selected from the group consisting of Ni, Fe, Co, B, Pb, Cr, Cu, Ti, Bi, Sn, W, P, Mo, Ag, Pt, Au, TiC, NbC, TiCN, TiN, CrN, $TiB_2$, $ZrB_2$, $Fe_2B$, and $Si_3N_4$;

wherein a film thickness of said low electric resistance layer is 1.0 $\mu$m or more, a film thickness of said corrosion resistance layer is 1.0 $\mu$m or more, and a film thickness of said peeling resistance layer is 1.0 $\mu$m or more.

* * * * *